US012689098B2

(12) United States Patent
Ishikawa

(10) Patent No.: US 12,689,098 B2
(45) Date of Patent:        Jul. 21, 2026

(54) ENERGY STORAGE APPARATUS

(71) Applicant: GS Yuasa International Ltd., Kyoto (JP)

(72) Inventor: Takaaki Ishikawa, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 908 days.

(21) Appl. No.: 17/421,667

(22) PCT Filed: Jan. 23, 2020

(86) PCT No.: PCT/JP2020/002274
§ 371 (c)(1),
(2) Date: Jul. 8, 2021

(87) PCT Pub. No.: WO2020/174954
PCT Pub. Date: Sep. 3, 2020

(65) Prior Publication Data
US 2022/0094021 A1      Mar. 24, 2022

(30) Foreign Application Priority Data

Feb. 27, 2019      (JP) .................................. 2019-034461

(51) Int. Cl.
H01M 50/507        (2021.01)
H01M 50/209        (2021.01)
(Continued)

(52) U.S. Cl.
CPC ....... H01M 50/507 (2021.01); H01M 50/209 (2021.01); H01M 50/242 (2021.01);
(Continued)

(58) Field of Classification Search
CPC .. H01M 50/50; H01M 50/507; H01M 50/516; H01M 50/547; H01M 50/209;
(Continued)

(56) References Cited

U.S. PATENT DOCUMENTS

2011/0076521 A1*    3/2011    Shimizu ..............    H01M 50/529
                                                                    429/82
2013/0130070 A1*    5/2013    Adachi .............    H01M 10/4207
                                                                    429/61
(Continued)

FOREIGN PATENT DOCUMENTS

JP          2001155702 A  *  6/2001    .........    H01M 10/625
JP          2012-243689 A      12/2012
(Continued)

OTHER PUBLICATIONS

Machine translation of JP-2001155702-A—of 2001 foreign publication cited above, translation obtained 2025 (Year: 2001).*
(Continued)

*Primary Examiner* — Jessie Walls-Murray
(74) *Attorney, Agent, or Firm* — MCGINN INTELLECTUAL PROPERTY LAW GROUP, PLLC

(57)        ABSTRACT

An energy storage apparatus includes a plurality of energy storage devices and bus bars. The plurality of energy storage devices include four energy storage devices arranged in two rows and two columns in a Z-axis direction and an X-axis direction and arranged with long side surfaces a facing the Z-axis direction. Each of the four energy storage devices includes an electrode terminal at an end portion in a Y-axis direction. The bus bar includes four connecting portions connected to the respective electrode terminals of the four energy storage devices, a curved portion extending in the X-axis direction, and notch portions extending along the Z-axis direction from end edges in the Z-axis direction. The curved portion is arranged at a position in the Z-axis direction between two connecting portions arranged in the Z-axis direction among the four connecting portions.

18 Claims, 5 Drawing Sheets

(51) Int. Cl.
*H01M 50/242* (2021.01)
*H01M 50/50* (2021.01)
*H01M 50/516* (2021.01)
*H01M 50/547* (2021.01)

(52) U.S. Cl.
CPC ......... *H01M 50/50* (2021.01); *H01M 50/547* (2021.01); *H01M 50/516* (2021.01)

(58) Field of Classification Search
CPC ............. H01M 50/242; H01M 50/503; H01M 50/204; H01M 50/55
See application file for complete search history.

(56) References Cited

U.S. PATENT DOCUMENTS

| | | | | | |
|---|---|---|---|---|---|
| 2013/0189563 | A1* | 7/2013 | Chang | ................ | H01M 50/503 |
| | | | | | 29/428 |
| 2014/0284077 | A1* | 9/2014 | Sakai | ..................... | H01L 24/37 |
| | | | | | 174/126.2 |
| 2015/0140391 | A1* | 5/2015 | Sakate | ............... | H01M 50/516 |
| | | | | | 174/68.2 |
| 2016/0093862 | A1* | 3/2016 | DeKeuster | ......... | H01M 50/209 |
| | | | | | 429/121 |

| | | | | | |
|---|---|---|---|---|---|
| 2017/0062789 | A1 | 3/2017 | Sim et al. | | |
| 2017/0338520 | A1* | 11/2017 | Lim | ..................... | H01R 25/165 |
| 2019/0020001 | A1 | 1/2019 | Nakano et al. | | |
| 2021/0203040 | A1* | 7/2021 | Okada | ................... | H01M 50/50 |

FOREIGN PATENT DOCUMENTS

| | | | | | |
|---|---|---|---|---|---|
| JP | 2014-186803 | A | 10/2014 | | |
| JP | 2015-099759 | A | 5/2015 | | |
| JP | 2015-138620 | A | 7/2015 | | |
| JP | 2016-018634 | A | 2/2016 | | |
| JP | 2016-091800 | A | 5/2016 | | |
| JP | 2016-207584 | A | 12/2016 | | |
| JP | 6045802 | B2 | 12/2016 | | |
| JP | 2017-130287 | A | 7/2017 | | |
| JP | 2017-216095 | A | 12/2017 | | |
| JP | 2018-152238 | A | 9/2018 | | |
| JP | WO2017/130259 | A1 | 11/2018 | | |
| WO | WO-2018235473 | A1 * | 12/2018 | ............... | H05K 7/20 |

OTHER PUBLICATIONS

International Search Report (ISR) (PCT Form PCT/ISA/210), in PCT/JP2020/002274, dated Apr. 14, 2020.

* cited by examiner

ENERGY STORAGE APPARATUS

TECHNICAL FIELD

The present invention relates to an energy storage apparatus including a plurality of energy storage devices and a bus bar which connects the plurality of energy storage devices to each other.

BACKGROUND ART

Patent Document 1 discloses a battery module including a terminal portion that elastically contacts a bus bar and a voltage detection unit that is electrically connected to the bus bar via the terminal portion. Patent Document 1 describes that, with the above configuration, even if the battery module is subjected to vibration, a connecting portion between the terminal portion and the bus bar is less likely to be damaged.

PRIOR ART DOCUMENT

Patent Document

Patent Document 1: JP-A-2016-18634

SUMMARY OF THE INVENTION

Problems to be Solved by the Invention

When an energy storage apparatus is mounted on an automobile or the like and used, not only a problem caused by a force applied from the outside such as vibration or impact but also a problem caused by expansion and contraction of an inside energy storage device occur. For example, in a bus bar that electrically and mechanically connects a plurality of energy storage devices to each other, when each energy storage device expands or contracts, there is a possibility that a defect occurs in a connecting portion between each energy storage device and an electrode terminal. For example, the height positions of the electrode terminals located above the plurality of energy storage devices may not coincide with each other. In this case, for example, there occurs a problem that it is difficult to accurately weld the bus bar and each electrode terminal.

The present invention has been made by the inventor of the present application by newly focusing on the above problems, and an object of the present invention is to provide a highly reliable energy storage apparatus.

Means for Solving the Problems

In order to achieve the above object, according to one aspect of the present invention, there is provided an energy storage apparatus including: a plurality of energy storage devices; and a first bus bar, in which the plurality of energy storage devices include four energy storage devices arranged in two rows and two columns in a first direction and a second direction orthogonal to the first direction and arranged with long side surfaces facing the first direction, in which each of the four energy storage devices includes an electrode terminal at an end portion in a third direction orthogonal to the first direction and the second direction, and in which the first bus bar includes: four connecting portions connected to the respective electrode terminals of the four energy storage devices; a curved portion arranged at a position in the first direction between two connecting portions arranged in the first direction among the four connecting portions and extending in the second direction; and a notch portion arranged between two connecting portions arranged in the second direction among the four connecting portions and extending along the first direction from an end edge of the first bus bar in the first direction.

According to this configuration, the energy storage apparatus includes the first bus bar connected to the four energy storage devices arranged in two rows and two columns. The first bus bar is provided with the curved portion corresponding to the position between the two energy storage devices arranged in the first direction, and the notch portion corresponding to the position between the two energy storage devices arranged in the second direction. Therefore, it is possible to connect the first bus bar while absorbing the difference in the positions of the electrode terminals of these four energy storage devices in the third direction.

Further, since the two energy storage devices arranged in the first direction are arranged such that the long side surfaces of the two energy storage devices are opposed to each other, when the internal pressure of at least one of the two energy storage devices is increased and the one long side surface is swollen, the electrode terminals of the two energy storage devices are to move in directions away from each other. In this regard, since the first bus bar according to the present aspect includes the curved portion extending in the second direction, the first bus bar is easily deformed following an increase in the distance between the two electrode terminals. Therefore, for example, the occurrence of a defect such as loosening or peeling of the connecting portion of the first bus bar is suppressed.

As described above, the energy storage apparatus according to the present aspect is a highly reliable energy storage apparatus.

Further, the notch portion may extend from the end edge of the first bus bar in the first direction to a position in front of the curved portion.

In this manner, by setting the length of the notch portion to a length that does not reach the curved portion, it is possible to suppress a decrease in a cross-sectional area in a conduction path while securing deformability of the first bus bar due to the presence of the notch portion. Therefore, problems such as a decrease in strength of the first bus bar or heat generation of the bus bar during charging and discharging hardly occur. This contributes to improvement of reliability of the energy storage apparatus.

Further, the curved portion may be provided continuously from one end to the other end in the second direction in the first bus bar.

According to this configuration, since the curved portion is formed in a series without providing a through hole or the like in the middle in the extending direction, for example, even if deformation is repeated, breakage or the like due to metal fatigue hardly occurs. This contributes to improvement of reliability of the energy storage apparatus.

Further, the energy storage apparatus may further include a second bus bar connected to another electrode terminal of each of two energy storage devices arranged in the first direction among the four energy storage devices, and a minimum value of a cross-sectional area of the first bus bar in a conduction path may be equal to or larger than a minimum value of a cross-sectional area of the second bus bar in a conduction path.

According to this configuration, while the first bus bar is provided with the notch portion for improving the deformability of the first bus bar, it is possible to secure the cross-sectional area for not hindering the conduction at the time of charging and discharging the energy storage apparatus. This contributes to improvement of reliability of the energy storage apparatus.

Further, each of the four connecting portions of the first bus bar may be formed by welding the first bus bar and the electrode terminal of each of the four energy storage devices.

According to this configuration, for example, the first bus bar is easily brought into abutment against the electrode terminal of each of the four energy storage devices when the first bus bar is welded to each electrode terminal, and hence, the first bus bar and each electrode terminal can be welded to each other with high accuracy. That is, high reliability can be obtained for electrical and mechanical connection with the electrode terminal in each of the four connecting portions included in the first bus bar. This contributes to improvement of reliability of the energy storage apparatus.

Advantages of the Invention

According to the present invention, it is possible to provide a highly reliable energy storage apparatus.

MODE FOR CARRYING OUT THE INVENTION

Figure 1:
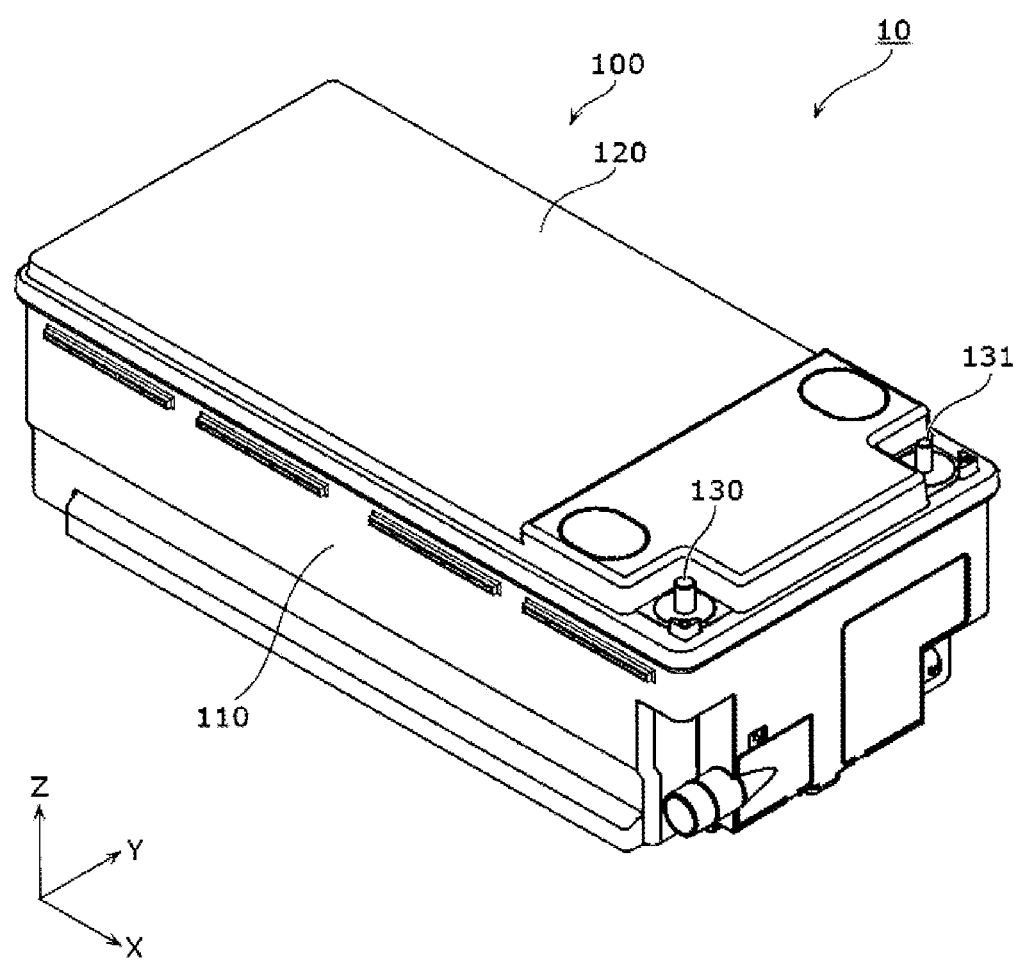
FIG. 1 is a perspective view showing an external appearance of an energy storage apparatus according to an embodiment.

Hereinafter, an energy storage apparatus according to an embodiment of the present invention (and a modification thereof) will be described with reference to the drawings. The embodiment described below describes a comprehensive or specific example. The numerical values, shapes, materials, components, positions for arranging the components and connection forms of the components, manufacturing steps, order of the manufacturing steps, and the like described in the following embodiment are merely examples, and are not intended to limit the present invention. Further, among the components in the following embodiment, components that are not described in the independent claim indicating the highest concept are described as optional components. In each drawing, dimensions and the like are not strictly illustrated.

Further, in the following description and drawings, a longitudinal direction of a cover case (an opposing direction of short side surfaces of the cover case), a longitudinal direction of an intermediate case (an opposing direction of short side surfaces of the intermediate case), an arrangement direction of the intermediate case and a control circuit board, a longitudinal direction of a lid of a case of an energy storage device (an opposing direction of short side surfaces of the case), or an arrangement direction of a pair of electrode terminals in one energy storage device is defined as an X-axis direction. Further, an arrangement direction of a body and a lid body of the intermediate case (an opposing direction of a bottom surface and the lid body of the intermediate case), or an arrangement direction of a body and the lid of the case of the energy storage device (an opposing direction of a bottom surface and the lid of the case) is defined as a Y-axis direction. Further, an arrangement direction of a body and a lid of the cover case (an opposing direction of a bottom surface and the lid of the cover case), an opposing direction of long side surfaces of the case of the energy storage device, or a thickness direction of the case is defined as a Z-axis direction. The X-axis direction, the Y-axis direction, and the Z-axis direction are directions intersecting (in the present embodiment, orthogonal to) each other. In the following description, for example, a plus side in the X-axis direction indicates an arrow direction side of the X-axis, and a minus side in the X-axis direction indicates a side opposite to the plus side in the X-axis direction. The same applies to the Y-axis direction and the Z-axis direction. Furthermore, expressions indicating relative directions or postures, such as parallel and orthogonal, strictly include cases where the directions or postures are not parallel and orthogonal. For example, two directions being orthogonal to each other not only means that the two directions are completely orthogonal to each other, but also means that the two directions are substantially orthogonal to each other, that is, a difference of, for example, about several percent is allowed.

Embodiment

[1. General Description of Energy Storage Apparatus 10]

Figure 2:
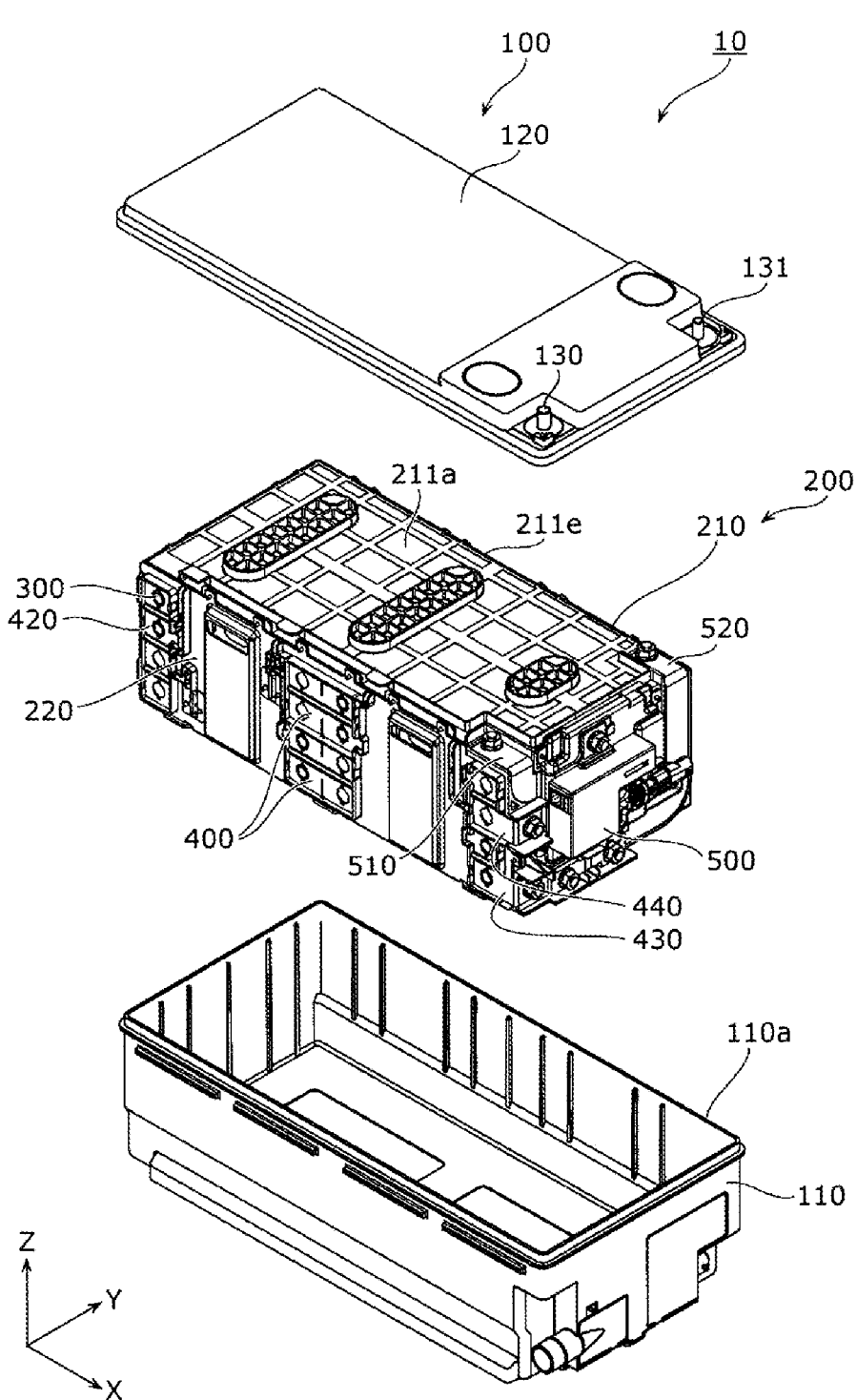
FIG. 2 is a perspective view showing an inside of a cover case by separating a body and a lid of the cover case in the energy storage apparatus according to the embodiment.
Figure 3:
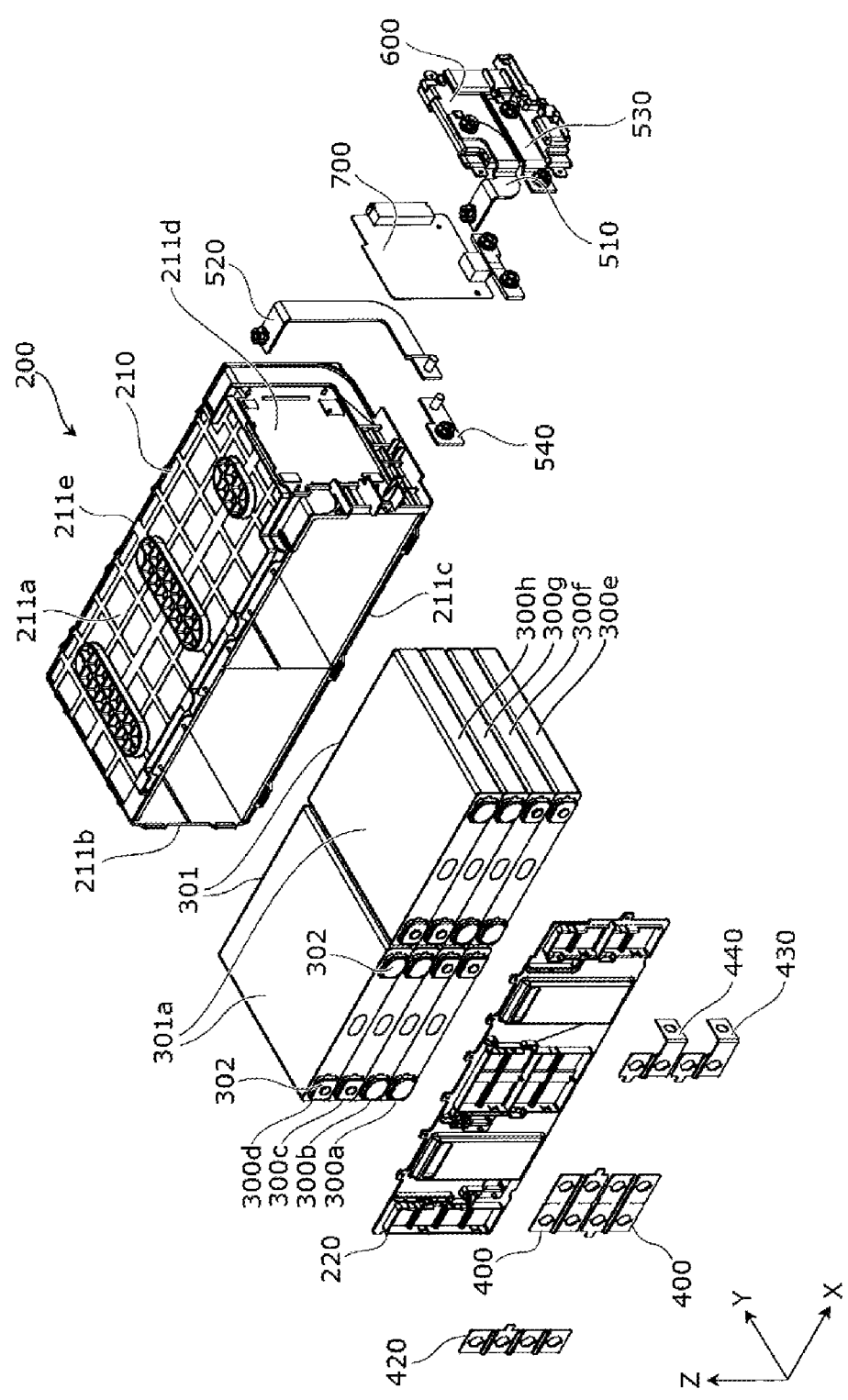
FIG. 3 is an exploded perspective view showing an internal configuration of the cover case in the energy storage apparatus according to the embodiment in an exploded manner.

First, a configuration of an energy storage apparatus 10 according to the present embodiment will be described. FIG. 1 is a perspective view showing an external appearance of the energy storage apparatus 10 according to the embodiment. FIG. 2 is a perspective view showing an inside of a cover case 100 by separating a body and a lid of the cover case 100 in the energy storage apparatus 10 according to the embodiment. FIG. 3 is an exploded perspective view showing an internal configuration of the cover case 100 in the energy storage apparatus 10 according to the embodiment in an exploded manner. In FIG. 3, illustration of an electric device 500 arranged outside a side wall portion 211*d* of an intermediate case 200 is omitted.

The energy storage apparatus 10 is an apparatus capable of charging electricity from the outside and discharging electricity to the outside. For example, the energy storage apparatus 10 is a battery module used for power storage applications, power supply applications, and the like. Specifically, the energy storage apparatus 10 is used as, for example, a battery for driving or starting an engine of a moving body such as an automobile such as an electric vehicle (EV), a hybrid electric vehicle (HEV), or a plug-in hybrid electric vehicle (PHEV), a motorcycle, a watercraft, a snowmobile, an agricultural machine, or a construction machine.

As shown in FIG. 1 to FIG. 3, the energy storage apparatus 10 includes the cover case 100, the intermediate case 200 accommodated in the cover case 100, a plurality of bus bars such as bus bars 400, the electric device 500, and a control circuit board 700. A plurality of energy storage devices 300 are accommodated in the intermediate case 200.

The cover case 100 is a case (module case) having a box shape (rectangular parallelepiped shape) which forms an outer case of the energy storage apparatus 10. That is, the cover case 100 accommodates the plurality of energy storage devices 300, the plurality of bus bars 400, the control circuit board 700, and the like, and protects the energy storage devices 300 and the like from an external impact or the like. The cover case 100 is formed of, for example, an insulating member such as polycarbonate (PC), polypropylene (PP), polyethylene (PE), polyphenylene sulfide resin (PPS), polybutylene terephthalate (PBT), polyphenylene ether (PPE (including modified PPE)), or ABS resin. With such a configuration, the cover case 100 prevents the inside energy storage devices 300 and the like from being electrically connected to an external conductive member made of metal or the like. The cover case 100 may be formed of a conductive member such as metal as long as insulation between the cover case 100 and the energy storage devices 300 and the like is maintained.

The cover case 100 includes a cover case body 110 which forms the body of the cover case 100 and a cover case lid body 120 which forms a lid body of the cover case 100 (an outer lid of the energy storage apparatus 10). The cover case body 110 is a bottomed rectangular cylindrical housing in which an opening 110*a* is formed on a plus side in the Z-axis direction. The cover case lid body 120 is a flat rectangular lid which is arranged on the plus side in the Z-axis direction of the cover case body 110, is connected to the cover case body 110, and closes the opening 110*a* of the cover case body 110. The cover case body 110 and the cover case lid body 120 may be formed of members made of the same material, or may be formed of members made of different materials.

External terminals 130 and 131, which are a pair of module terminals (total terminals) on a positive electrode side and a negative electrode side, are arranged on an end portion of the cover case lid body 120 on the plus side in the X-axis direction. The external terminals 130 and 131 are electrically connected to the plurality of energy storage devices 300, and the energy storage apparatus 10 charges electricity from the outside and discharges electricity to the outside through the external terminals 130 and 131. The external terminals 130 and 131 are formed of, for example, a conductive member made of metal such as aluminum, an aluminum alloy, copper, or a copper alloy. In the present embodiment, the external terminal 130 is a positive-electrode-side external terminal, and the external terminal 131 is a negative-electrode-side external terminal.

The intermediate case 200 is a case having a box shape (rectangular parallelepiped shape) which forms an inner box of the energy storage apparatus 10. To be more specific, the intermediate case 200 accommodates the plurality of energy storage devices 300, and integrally holds the components accommodated in the cover case 100 by attaching the plurality of bus bars 400, the control circuit board 700, and the like thereon. The intermediate case 200 may be formed of a member made of any material, but is preferably made of an insulating member such as resin from the viewpoint of securing insulation, and is preferably formed of a member having high strength such as metal from the viewpoint of securing strength. Similarly to the cover case 100, examples of the insulating member include PC, PP, PE, PPS, PBT, PPE (including modified PPE), and ABS resin. Examples of the metal include stainless steel, aluminum, an aluminum alloy, iron, and a plated steel plate.

The intermediate case 200 includes an intermediate case body 210 which forms a body of the intermediate case 200 and an intermediate case lid body 220 which forms a lid body of the intermediate case 200 (an inner lid of the energy storage apparatus 10). The intermediate case body 210 is a bottomed rectangular cylindrical housing in which an opening is formed on a minus side in the Y-axis direction. The intermediate case body 210 includes four side wall portions 211*a*, 211*b*, 211*c*, and 211*d* and a bottom wall portion 211*e* at a position facing the intermediate case lid body 220 as wall portions surrounding the plurality of energy storage devices 300.

The intermediate case lid body 220 is a flat rectangular lid which is arranged on the minus side in the Y-axis direction of the intermediate case body 210, is connected to the intermediate case body 210, and closes the opening of the intermediate case body 210. That is, the intermediate case lid body 220 is arranged so as to face side wall portions of the cover case body 110. The intermediate case lid body 220 is arranged on the minus side in the Y-axis direction of the energy storage devices 300, and also has a function as a bus bar frame (bus bar plate) which holds bus bars 400, 420, 430, and 440 (hereinafter, the bus bars 400 and the like) to perform position regulation and the like of the bus bars 400 and the like.

The intermediate case 200 is bonded and fixed to the cover case 100. In the present embodiment, the intermediate case body 210 is bonded to the cover case body 110 with an adhesive or the like, whereby the intermediate case 200 is fixed to the cover case 100. The intermediate case body 210 and the intermediate case lid body 220 may be formed of members made of the same material, or may be formed of members made of different materials.

The energy storage device 300 is a secondary battery (battery cell) capable of charging and discharging electricity, and more specifically, is a nonaqueous electrolyte secondary battery such as a lithium-ion secondary battery. In the present embodiment, in order to distinguish the eight energy storage devices 300 from one another, as shown in FIG. 3, different reference numerals (300*a* to 300*h*) are given to the respective energy storage devices 300.

The energy storage device 300 has a flat prismatic shape (rectangular parallelepiped shape), and in the present embodiment, the eight energy storage devices 300 are arranged in the X-axis direction and the Z-axis direction in a state of being horizontally placed (laid down). That is, the plurality of energy storage devices 300 are arranged in a matrix. Specifically, the energy storage devices 300*a* to 300*d* are stacked (stacked flat) in the Z-axis direction, the energy storage devices 300*e* to 300*h* are stacked (stacked flat) in the Z-axis direction, and the energy storage devices 300*a* to 300*d* and the energy storage devices 300*e* to 300*h* are arranged side by side in the X-axis direction.

In other words, each of the plurality of energy storage devices 300 is arranged in a posture where long side surfaces (long side surfaces 301*a* shown in FIG. 3) face the Z-axis direction (one example of a first direction). Each energy storage device 300 has the long side surfaces 301*a* on both sides (a plus side and a minus side) in the Z-axis direction. In addition, two energy storage devices 300 are arranged side by side in the X-axis direction (an example of a second direction) orthogonal to the Z-axis direction. Each of the plurality of energy storage devices 300 includes electrode terminals 302 at an end portion thereof in the Y-axis direction (one example of a third direction) orthogonal to the Z-axis direction and the X-axis direction. In the present embodiment, the eight energy storage devices 300 are accommodated in the intermediate case 200 in a posture where the pairs of electrode terminals 302 are positioned at the end portions on the minus side in the Y-axis direction.

For example, the energy storage device 300a and the energy storage device 300e are arranged side by side in the X-axis direction in a posture where the long side surfaces 301a face the Z-axis direction. The energy storage device 300a and the energy storage device 300e each include the pair of electrode terminals 302 at the end portion on the minus side in the Y-axis direction.

The number of energy storage devices 300 is not particularly limited, and any number of energy storage devices 300 may be stacked (stacked flat) in the Z-axis direction, or any number of energy storage devices 300 may be arranged in the X-axis direction. Further, the shape of the energy storage device 300 is not limited to the above-mentioned prismatic shape, and may be a polygonal columnar shape, a cylindrical shape, an elliptical columnar shape, an oval columnar shape, or the like other than the above-mentioned prismatic shape, or the energy storage device 300 may be a laminate-type energy storage device. The energy storage device 300 is not limited to the nonaqueous electrolyte secondary battery, and may be a secondary battery other than the nonaqueous electrolyte secondary battery, or may be a capacitor. The energy storage device 300 may not be a secondary battery but may be a primary battery that can use stored electricity without being charged by a user. Further, the energy storage device 300 may be a battery using a solid electrolyte.

In the present embodiment, the energy storage device 300 includes a case 301, and the pair of electrode terminals 302 are arranged on a lid portion of the case 301 as described above. Among the pair of electrode terminals 302, the electrode terminal 302 having a circle drawn in the center in FIG. 3 is a negative electrode terminal, and the other electrode terminal 302 is a positive electrode terminal. For example, in the energy storage device 300a, the electrode terminal 302 on the plus side in the X-axis direction is a negative electrode terminal, and the electrode terminal 302 on the minus side in the X-axis direction is a positive electrode terminal. The circle drawn on the electrode terminal 302 on the minus side represents an end portion of a shaft portion exposed from a terminal body (a portion arranged outside the case 301). It is not essential that the end portion of the shaft portion of the electrode terminal 302 on the minus side be exposed from the terminal body, and the end portion of the shaft portion of the electrode terminal 302 on the minus side may be covered with the terminal body. In this case, the upper surface (the surface on the minus side in the Y-axis direction) of the terminal body may be flat.

Although an electrode assembly, current collectors (a positive electrode current collector and a negative electrode current collector), an electrolyte solution (nonaqueous electrolyte), and the like are accommodated in the case 301, these are not shown. A kind of the electrolyte solution is not particularly limited as long as performance of the energy storage device 300 is not impaired, and various electrolyte solutions can be selected. An insulating sheet (not shown) is arranged on the side surface of the case 301, and thus, insulation between the adjacent energy storage devices 300 is ensured.

The case 301 is a prismatic (rectangular parallelepiped) case, and is formed of, for example, a metal member such as stainless steel, aluminum, an aluminum alloy, iron, or a plated steel plate. The electrode terminals 302 are a pair of metal terminals (the positive electrode terminal and the negative electrode terminal) arranged to protrude from the lid portion of the case 301 toward the intermediate case lid body 220 (toward the minus side in the Y-axis direction).

That is, the electrode terminals 302 are electrically connected to a positive electrode plate and a negative electrode plate of the electrode assembly via the current collectors, lead out the electricity stored in the electrode assembly to the external space of the energy storage device 300, and introduce the electricity into the internal space of the energy storage device 300 in order to store the electricity in the electrode assembly. The electrode terminal 302 is made of aluminum, an aluminum alloy, copper, a copper alloy, or the like.

The electrode assembly is an energy storage element (power generating element) formed by laminating the positive electrode plate, the negative electrode plate, and a separator. Here, the positive electrode plate included in the electrode assembly is formed by forming a positive active material layer on a positive electrode substrate layer which is an elongated strip-shaped current collecting foil made of metal such as aluminum or an aluminum alloy. The negative electrode plate is formed by forming a negative active material layer on a negative electrode substrate layer which is an elongated strip-shaped current collecting foil made of metal such as copper or a copper alloy. As the positive electrode active material used for the positive active material layer and the negative active material used for the negative active material layer, known materials can be appropriately used as long as they can occlude and discharge lithium ions. The current collectors are members (the positive electrode current collector and the negative electrode current collector) electrically connected to the electrode terminals 302 and the electrode assembly and having conductivity and rigidity. The positive electrode current collector is formed of aluminum, an aluminum alloy, or the like similarly to the positive electrode substrate layer of the positive electrode plate, and the negative electrode current collector is formed of copper, a copper alloy, or the like similarly to the negative electrode substrate layer of the negative electrode plate.

The bus bars 400 and the like (400, 420, 430, and 440) are rectangular plate-like members which are arranged on the minus side in the Y-axis direction of the plurality of energy storage devices 300 and electrically and mechanically connect the electrode terminals 302 of the two or four energy storage devices 300 to each other. The bus bars 400 and the like are each formed of, for example, a conductive member made of metal such as copper, a copper alloy, aluminum, or an aluminum alloy. In the present embodiment, the bus bars 400 and the like are welded to the electrode terminals 302, whereby the bus bars 400 and the like are connected to the electrode terminals 302. As this welding method, for example, laser welding is used, but other methods may be used.

In the present embodiment, as described above, in the electrode terminal 302 on the negative electrode side, the end portion of the shaft portion is exposed from the terminal body. Thus, the bus bars 400 and the like are each provided with two or four openings (interference avoidance openings) for avoiding interference with the end portion of the shaft portion, and the periphery of the interference avoidance opening is joined (welded) to the electrode terminal 302.

In the present embodiment, four sets of two energy storage devices 300 connected in parallel are connected in series. Specifically, the energy storage devices 300g and 300h, the energy storage devices 300c and 300d, the energy storage devices 300a and 300b, and the energy storage devices 300e and 300f are connected in parallel. The obtained four sets of energy storage devices 300 are connected in series.

More specifically, the bus bar 440 is joined to the electrode terminal 302 on the positive electrode side of each of the energy storage devices 300*g* and 300*h*. The bus bar 400 is joined to the electrode terminal 302 on the negative electrode side of each of the energy storage devices 300*g* and 300*h* and the electrode terminal 302 on the positive electrode side of each of the energy storage devices 300*c* and 300*d*. The bus bar 420 is joined to the electrode terminal 302 on the negative electrode side of each of the energy storage devices 300*c* and 300*d* and the electrode terminal 302 on the positive electrode side of each of the energy storage devices 300*a* and 300*b*. The bus bar 400 is joined to the electrode terminal 302 on the negative electrode side of each of the energy storage devices 300*a* and 300*b* and the electrode terminal 302 on the positive electrode side of each of the energy storage devices 300*e* and 300*f*. Further, the bus bar 430 is joined to the electrode terminal 302 on the negative electrode side of each of the energy storage devices 300*e* and 300*f*. That is, a total positive terminal of an energy storage device group including the eight energy storage devices 300 is the bus bar 440, and a total negative terminal of the energy storage device group is the bus bar 430. The bus bar 440 is connected to the external terminal 130 (see FIG. 1) via a bus bar 530, the electric device 500, a bus bar 510, and the like. The bus bar 430 is connected to the external terminal 131 (see FIG. 1) via a bus bar 540, the control circuit board 700, a bus bar 520, and the like.

The electric device 500 is a device including control components such as a relay and a connector, and the control circuit board 700 is a control device for controlling charging and discharging of each energy storage device 300 such as a central processing unit (CPU) and a resistance element. The control circuit board 700 is also called, for example, a battery management unit (BMU). The energy storage apparatus 10 includes a thermistor (not shown), wiring for voltage detection, and the like, and the control circuit board 700 controls charging and discharging of each energy storage device 300 based on the detected temperature, voltage value, and the like. In FIG. 3, the electronic components such as the CPU and the resistance element included in the control circuit board 700 are not shown. The control circuit board 700 is attached to the intermediate case 200 in a state of being covered with the circuit cover 600. Similarly to the intermediate case 200, the circuit cover 600 is made of resin such as PC or PP, and also serves to hold the bus bar 510 and the bus bar 530.

[2. Configuration of Bus Bar 400]

In the energy storage apparatus 10 configured as described above, the bus bars 400 are joined to the respective electrode terminals 302 of the four energy storage devices 300 arranged in two rows and two columns when viewed from the minus side in the Y-axis direction. The configuration of the bus bar 400 will be described with reference to FIGS. 4 and 5. The bus bar 400 is an example of a first bus bar.

Figure 4:
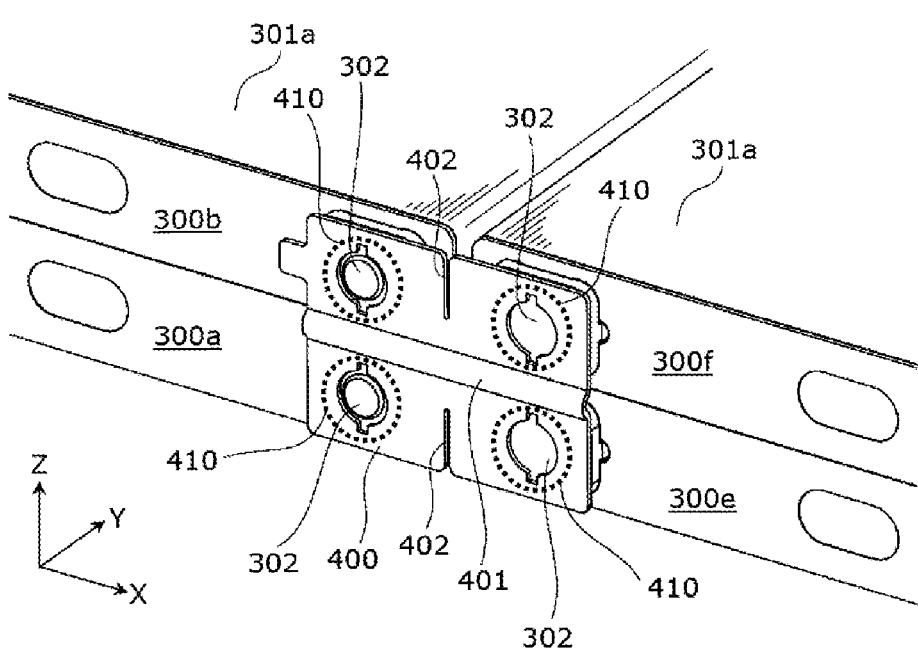
FIG. 4 is a perspective view showing a configuration of a bus bar connected to four energy storage devices arranged in two rows and two columns according to the embodiment.
Figure 5:
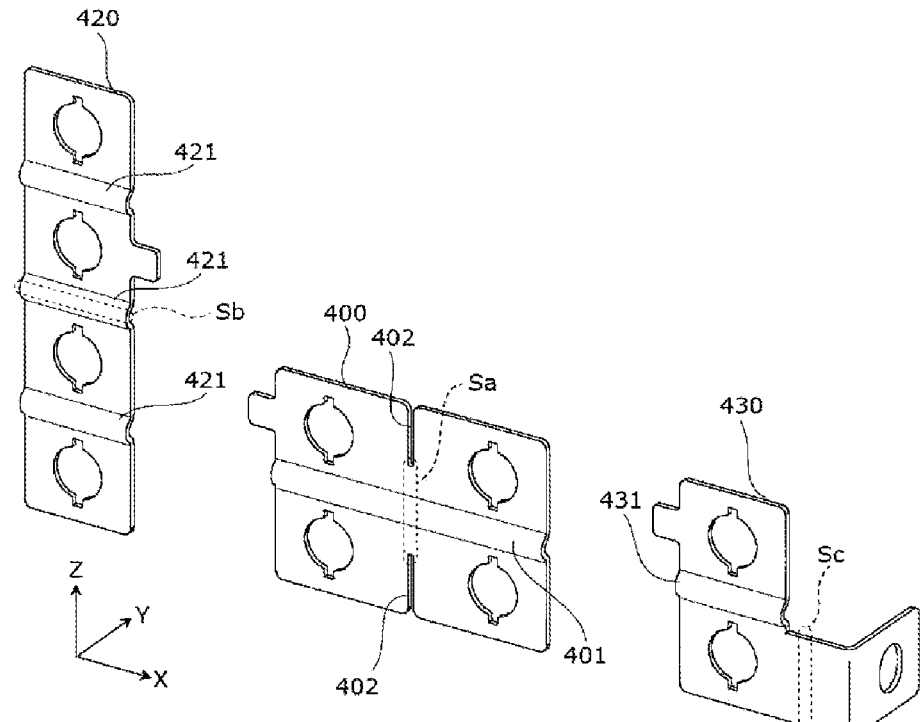
FIG. 5 is a perspective view showing configurations of various bus bars to be connected to electrode terminals of energy storage devices according to the embodiment.

FIG. 4 is a perspective view showing a configuration of the bus bar 400 according to the embodiment. In FIG. 4, attention is paid to the bus bar 400 joined to the energy storage devices 300*a*, 300*b*, 300*e*, and 300*f* among the two bus bars 400 included in the energy storage apparatus 10, and only the periphery thereof is illustrated. In FIG. 4, positions of connecting portions 410 between the bus bar 400 and the electrode terminals 302 are schematically represented by dotted circles. FIG. 5 is a perspective view showing configurations of various bus bars (bus bars 400, 420, and 430) to be connected to the electrode terminals 302 of the energy storage devices 300 according to the embodiment. In the present embodiment, as shown in FIG. 3, the bus bar 440 has the same shape as the bus bar 430, and thus the bus bar 440 is not shown in FIG. 5.

As shown in FIG. 2 to FIG. 4, the energy storage apparatus 10 according to the embodiment includes the plurality of energy storage devices 300 and the bus bars 400 which are examples of the first bus bars. The plurality of energy storage devices 300 include the four energy storage devices 300 (in FIG. 4, the energy storage devices 300*a*, 300*b*, 300*e*, and 3000 arranged in two rows and two columns in the Z-axis direction and the X-axis direction and arranged with the long side surfaces 301*a* facing the Z-axis direction. Each of the four energy storage devices 300 includes the electrode terminal 302 at the end portion in the Y-axis direction.

The bus bar 400 includes four connecting portions 410 connected to the respective electrode terminals 302 of the four energy storage devices 300, a curved portion 401 extending in the X-axis direction, and notch portions 402 extending along the Z-axis direction from end edges in the Z-axis direction. The curved portion 401 is arranged at a position in the Z-axis direction between two connecting portions 410 arranged in the Z-axis direction among the four connecting portions 410.

As described above, the energy storage apparatus 10 according to the present embodiment includes the bus bar 400 connected to the four energy storage devices 300 arranged in two rows and two columns. The bus bar 400 is provided with the curved portion 401 corresponding to a position between two energy storage devices 300 arranged in the Z-axis direction. The bus bar 400 is further provided with the notch portions 402 corresponding to positions each between two energy storage devices 300 arranged in the X-axis direction. That is, the bus bar 400 is provided with portions which facilitate deformation of the bus bar 400 (improve deformability) at positions corresponding to inter-row portions and inter-column portions in the four energy storage devices 300 arranged in two rows and two columns. This facilitates adjustment of the positions of the four connecting portions 410 in the Y-axis direction. Therefore, it is possible to connect the bus bar 400 while absorbing the difference in the positions of the electrode terminals 302 of the four energy storage devices 300 in the Y-axis direction.

Further, since the two energy storage devices 300 arranged in the Z-axis direction are arranged such that the long side surfaces 301*a* of the two energy storage devices 300 are opposed to each other, when the internal pressure of at least one of the two energy storage devices 300 is increased and the one long side surface 301*a* is swollen, the electrode terminals 302 of the two energy storage devices 300 are displaced in directions away from each other. For example, in FIG. 4, when the long side surface 301*a* of the energy storage device 300*a* facing the energy storage device 300*b* is swollen, the electrode terminal 302 of the energy storage device 300*a* and the electrode terminal 302 of the energy storage device 300*b* are to move in directions away from each other. In this case, since the bus bar 400 according to the present aspect has the curved portion 401 extending in the X-axis direction, the bus bar 400 is easily deformed following an increase in the distance between the two electrode terminals 302. Therefore, for example, the occurrence of a defect such as loosening or peeling of the connecting portion 410 of the bus bar 400 is suppressed.

In the present embodiment, more specifically, the bus bar 400 includes the two notch portions 402 separated corresponding to two sets of two energy storage devices 300 (the set of energy storage devices 300*a* and 300*e* and the set of energy storage devices 300*b* and 3000 arranged in the X-axis direction. The curved portion 401 extending in the X-axis direction is arranged between the two notch portions 402 arranged in the Z-axis direction.

Here, if a notch portion is provided instead of the curved portion 401 at the position of the curved portion 401, the bus bar 400 can be deformed following an increase in the distance between the two electrode terminals 302 arranged in the Z-axis direction. However, for example, when the energy storage devices 300 repeatedly expand and contract to repeatedly open and close the notch portion, stress concentrates on an end portion of the notch portion near the center of the bus bar 400, and as a result, it is conceivable that damage due to metal fatigue occurs at the end portion. In this regard, in the bus bar 400 according to the present embodiment, when the curved portion 401 is repeatedly deformed as the energy storage devices 300 repeatedly expand and contract, the stress generated in the curved portion 401 is dispersed in the extending direction (X-axis direction) and hence, the stress concentration hardly occurs. That is, in consideration that the energy storage devices 300 repeatedly expand and contract, it is advantageous to provide the curved portion 401 at a corresponding position between the two energy storage devices 300 arranged with the long side surfaces 301*a* facing each other. As described above, the energy storage apparatus 10 according to the present embodiment is a highly reliable energy storage apparatus.

In the present embodiment, the notch portions 402 included in the bus bar 400 extend from the end edges of the bus bar 400 in the Z-axis direction to positions in front of the curved portion 401.

In this manner, by setting the length of each of the notch portions 402 to a length that does not reach the curved portion 401, it is possible to suppress a decrease in a cross-sectional area in a conduction path while securing deformability of the bus bar 400 due to the presence of the notch portions 402. Therefore, problems such as a decrease in strength of the bus bar 400 or heat generation of the bus bar 400 during charging and discharging hardly occur. This contributes to the improvement of reliability of the energy storage apparatus 10.

Further, in the present embodiment, the curved portion 401 included in the bus bar 400 is provided continuously from one end to the other end in the X-axis direction in the bus bar 400.

That is, in the present embodiment, since the curved portion 401 is formed in a series without providing a through hole or the like in the middle in the extending direction, for example, even if deformation is repeated due to expansion and contraction of the energy storage devices 300, breakage or the like due to metal fatigue hardly occurs. This contributes to the improvement of reliability of the energy storage apparatus 10.

In the present embodiment, each of the four connecting portions 410 of the bus bar 400 is formed by welding the bus bar 400 and the electrode terminal 302 of each of the four energy storage devices 300 as described above.

That is, since the bus bar 400 according to the present embodiment has high deformability by having the curved portion 401 and the notch portions 402 extending in the directions orthogonal to each other, the bus bar 400 is easily brought into abutment against each of the electrode terminals 302 when welded to each of the electrode terminals 302 of the four energy storage devices 300. Therefore, the bus bar 400 and each of the electrode terminals 302 can be welded with high accuracy. That is, high reliability can be obtained for electrical and mechanical connection with the electrode terminal 302 in each of the four connecting portions 410 included in the bus bar 400. This contributes to the improvement of reliability of the energy storage apparatus 10.

In FIG. 4, the positions of the four connecting portions 410 included in the bus bar 400 are schematically represented by dotted circles, but the positions and shapes of the connecting portions 410 are not limited thereto. It is sufficient that the connecting portions 410 are formed at positions of the bus bar 400 to which the electrode terminals 302 can be welded. For example, the connecting portion 410 corresponding to one electrode terminal 302 may be configured by a plurality of separated regions in plan view.

In the present embodiment, as shown in FIG. 5, the bus bar 420 joined to the four electrode terminals 302 arranged in the Z-axis direction and the bus bar 430 joined to the two electrode terminals 302 arranged in the Z-axis direction also include curved portions similarly to the bus bar 400. Specifically, the bus bar 420 includes three curved portions 421, and the bus bar 430 includes one curved portion 431. In addition, the bus bar 440 (see FIG. 3) having the same shape as the bus bar 430 also includes one curved portion. That is, in the present embodiment, each of the bus bars 400 and the like connecting two or more energy storage devices 300 to each other includes one curved portion corresponding to a position between two energy storage devices 300 adjacent to each other in the Z-axis direction. Therefore, when one or more energy storage devices 300 expand, each of the bus bars 400 and the like can be deformed following the displacement of the electrode terminals 302 caused by the expansion. Therefore, the occurrence of a defect in the connecting portion of each of the bus bars 400 and the like with the electrode terminal is suppressed.

In the present embodiment, the minimum cross-sectional area of the bus bar 400 connected to the electrode terminals 302 of the two energy storage devices 300 arranged in the Z-axis direction in the conduction path is, as shown in FIG. 5, a cross-sectional area of a portion between the notch portions 402 separated in the Z-axis direction, and a value thereof is Sa. Sa is equal to or larger than the minimum value of the cross-sectional area of the bus bar connected to the other electrode terminals 302 of the two energy storage devices 300 in the conduction path.

Specifically, when the minimum value of the cross-sectional area of the bus bar 420 in the conduction path is Sb and the minimum value of the cross-sectional area of the bus bar 430 in the conduction path is Sc, Sa≥Sb and Sa≥Sc are satisfied.

That is, in the present embodiment, while the bus bar 400 is provided with the notch portions 402 for improving the deformability of the bus bar 400, it is possible to secure the cross-sectional area for not hindering the conduction at the time of charging and discharging the energy storage apparatus 10. This contributes to the improvement of reliability of the energy storage apparatus 10.

Although the energy storage apparatus 10 according to the embodiment has been described above, the energy storage apparatus 10 may include a bus bar which is connected to the four energy storage devices 300 arranged in two rows and two columns and is different from the bus bar 400 shown in FIG. 2 to FIG. 5. Therefore, a modification example of the bus bar 400 will be described below focusing on a difference from the above embodiment.

Modification Example

Figure 6:
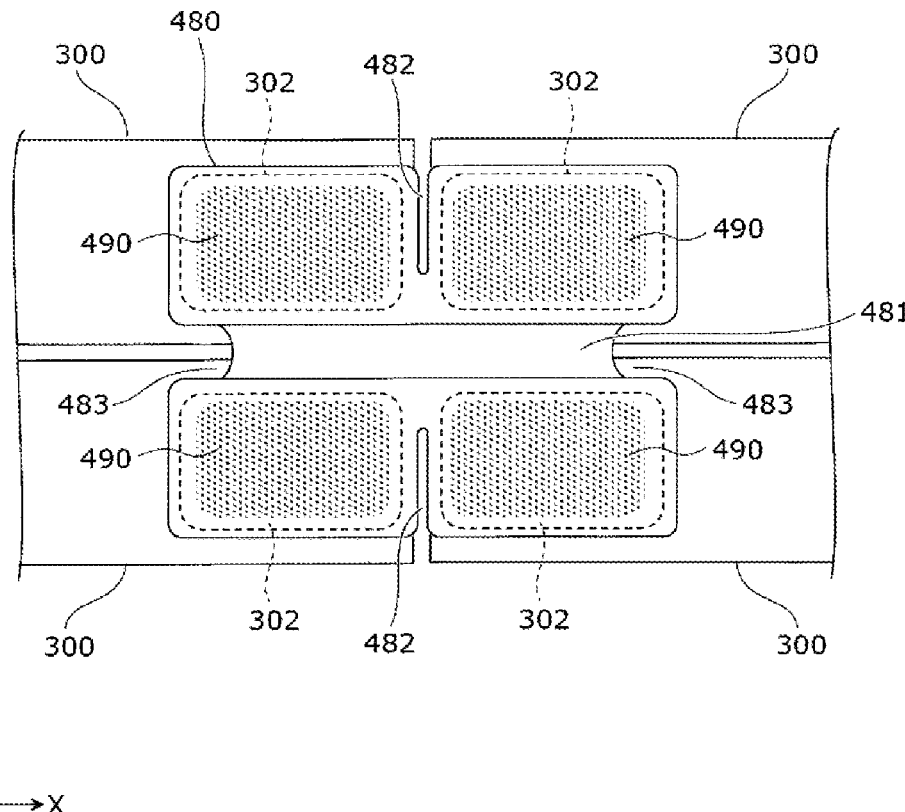
FIG. 6 is a plan view showing a configuration of a bus bar according to a modification example of the embodiment.

FIG. 6 is a plan view showing a configuration of a bus bar 480 according to a modification example of the embodiment. In FIG. 6, for connecting portions 490 included in the bus bar 480, approximate arrangement regions are represented by dotted regions. Approximate outer shapes of the electrode terminals 302 hidden by the bus bar 480 are indicated by dotted lines.

The bus bar 480 according to the present modification example shown in FIG. 6 is connected to the electrode terminals 302 of the respective four energy storage devices 300 arranged in two rows and two columns in the Z-axis direction and the X-axis direction. The bus bar 480 includes a curved portion 481 extending in the X-axis direction and notch portions 482 extending along the Z-axis direction from end edges in the Z-axis direction. These configurations are common to the bus bar 400 according to the embodiment. Although not shown in FIG. 6, the curved portion 481 has a curved shape convex toward the minus side in the Y-axis direction, similarly to the curved portion 401 according to the embodiment.

However, the bus bar 480 according to the present modification example does not have an opening (interference avoidance opening) for avoiding interference with the end portion of the shaft portion of the electrode terminal 302. That is, in the present modification example, all the four electrode terminals 302 to which the bus bar 480 is connected each have a structure in which the end portion of the shaft portion is not exposed. In this case, since the bus bar 480 does not need to have the interference avoidance opening at the portion connected to the electrode terminal 302, the connecting portions 490 having a relatively large area can be formed in the bus bar 480. Even in this case, for example, an opening (inspection opening) for confirming the position of the bus bar 480 with respect to the electrode terminals 302 may be provided before the bus bar 480 and the electrode terminals 302 are welded. Even in this case, since the size of the inspection opening in plan view is relatively small, relatively large areas can be secured as the connecting portions 490.

In addition, the bus bar 480 has recessed portions 483 recessed inward from end edges in the X-axis direction in plan view at the end edges, and the recessed portions 483 are located at ends of the curved portion 481.

As a result, for example, the curved portion 481 can be easily deformed, and as a result, the followability of the bus bar 480 to the displacement of the electrode terminals 302 due to the expansion of the energy storage devices 300 is improved. In addition, since the recessed portions 483 are arranged at positions that do not substantially affect the conduction path in the bus bar 480, for example, an increase in resistance due to the provision of the recessed portions 483 does not occur.

The curved portion 481 of the bus bar 480 is provided continuously from one end to the other end in the X-axis direction at positions where the recessed portions 483 are arranged in the Z-axis direction. That is, there is no element that interrupts the continuity of the curved portion 481 such as a through hole in the middle of the curved portion 481. Therefore, even if the bus bar 480 is repeatedly deformed due to expansion and contraction of the energy storage devices 300, breakage or the like due to metal fatigue hardly occurs.

In FIG. 6, the recessed portions 483 are arranged at both ends of the bus bar 480 in the X-axis direction, but the recessed portion 483 may be arranged only at one end in the X-axis direction. The recessed portions 483 may be provided in the bus bar 400 according to the embodiment.

Other Embodiments

Although the energy storage apparatus 10 according to the embodiment of the present invention has been described above, the present invention is not limited to the present embodiment. That is, the embodiment disclosed herein is illustrative in all respects and is not restrictive, and the scope of the present invention is indicated by the claims, and includes all modifications within the meaning and scope equivalent to the claims.

For example, the curved portion 401 included in the bus bar 400 according to the embodiment has a curved shape convex toward the minus side in the Y-axis direction. However, for example, when the position of the upper surface (the connecting surface with the bus bar 400) of the electrode terminal 302 is away from the case 301, the curved portion 401 may have a curved shape convex toward a plus side in the Y-axis direction (the energy storage device 300 side). With such a configuration, a portion of the bus bar 400 which projects toward a side opposite to the energy storage devices 300 is eliminated and hence, for example, a space of the bus bar 400 on the side opposite to the energy storage devices 300 can be used as a region for wiring or the like.

Although the bus bar 400 and the electrode terminals 302 of the four energy storage devices 300 are connected to each other by welding, a method of connecting the bus bar 400 and the electrode terminals 302 to each other is not particularly limited. As a method of the connection, fastening using a bolt and a nut may be used, and plastic joining such as caulking of a rivet may be used. For example, when bolt terminals are employed as the electrode terminals 302, each of the four interference avoidance openings included in the bus bar 400 may be used as a through hole through which the shaft portion of the bolt terminal passes. In addition, when the terminal body of the electrode terminal 302 is provided with a rivet protruding toward the outside, each of the four interference avoidance openings included in the bus bar 400 may be used as a through hole for passing and caulking the rivet.

In addition, a width (width in the X-axis direction) of the notch portion 402 included in the bus bar 400 in the direction orthogonal to the extending direction is not limited to, for example, the width shown in FIG. 4, and may be larger than or smaller than this width. That is, it is sufficient that the notch portion 402 can break physical continuity of portions on both sides sandwiching the notch portion 402 in the bus bar 400. Thus, each of the portions on both sides sandwiching the notch portion 402 can be displaced independently from the other portion. Therefore, the width of the notch portion 402 in the direction orthogonal to the extending direction may be, for example, small to the extent that it cannot be visually recognized, or large to the extent that it does not affect the connecting portions 410. An end portion of the notch portion 402 on the curved portion 401 side is preferably formed in a curved shape in plan view, for example, from the viewpoint of alleviating stress concentration.

Although the energy storage apparatus 10 includes the intermediate case 200 which accommodates the plurality of energy storage devices 300 and the cover case 100 which accommodates the intermediate case 200, an accommodating body having a double structure as described above is not indispensable. For example, even if the plurality of energy storage devices 300 are directly accommodated in the cover case or are not accommodated in any case, there is no substantial influence on the deformability of the bus bar 400.

A form constructed by freely combining the components included in the above-described embodiment and its modification example is also included in the scope of the present invention.

INDUSTRIAL APPLICABILITY

The present invention can be applied to an energy storage apparatus including an energy storage device such as a lithium-ion secondary battery.

DESCRIPTION OF REFERENCE SIGNS

10: energy storage apparatus
300, 300a, 300b, 300c, 300d, 300e, 300f, 300g: energy storage device
301a: long side surface
302: electrode terminal
400, 420, 430, 440, 480, 510, 520, 530, 540: bus bar
401, 421, 431, 481: curved portion
402, 482: notch portion
410, 490: connecting portion

The invention claimed is:

1. An energy storage apparatus comprising:
a plurality of energy storage devices; and
a first bus bar,
wherein the plurality of energy storage devices includes four energy storage devices arranged in two rows and two columns in a first direction and a second direction orthogonal to the first direction and arranged with long side surfaces of the four energy storage devices facing the first direction, the long side surfaces being larger than other side surfaces of the four energy storage devices,
wherein each of the four energy storage devices includes an electrode terminal at an end portion of each of the four energy storage devices in a third direction orthogonal to the first direction and the second direction, and
wherein the first bus bar includes:
four connecting portions electrically connected to the respective electrode terminals of the four energy storage devices and disposed so as for a line connecting the four connecting portions to make a rectangle shape;
a curved portion arranged at a position in the first direction between two connecting portions arranged in the first direction among the four connecting portions and extending in the second direction; and
a notch portion arranged between two connecting portions arranged in the second direction among the four connecting portions and extending along the first direction from an end edge of the first bus bar in the first direction,
wherein the first bus bar is an integral member and formed as a single bus bar,
wherein the curved portion is provided continuously from one end to the other end in the second direction in the first bus bar,
wherein the four connecting portions electrically and mechanically connect the electrode terminals of the four energy storage devices to each other,
wherein the long side surfaces of the four energy storage devices are exclusive of smaller side surfaces and edges, and
wherein the long side surfaces are larger in surface area than other side surfaces of the four energy storage devices.

2. The energy storage apparatus according to claim 1, wherein the notch portion extends from the end edge of the first bus bar in the first direction to a position in front of the curved portion, and wherein the first bus bar comprises a rectangular plate-like member which is arranged on the third direction of the plurality of energy storage devices.

3. The energy storage apparatus according to claim 1, further comprising a second bus bar connected to another electrode terminal of each of two energy storage devices arranged in the first direction among the four energy storage devices,
wherein a minimum value of a cross-sectional area of the first bus bar in a conduction path is equal to or larger than a minimum value of a cross-sectional area of the second bus bar in a conduction path, and
wherein the first bus bar includes the four connecting portions, each including a via and connected to respective electrode terminals of the four energy storage devices in the single bus bar,
wherein the long side surfaces of the four energy storage devices are exclusive of side surfaces that are smaller in surface area than the long side surfaces and edges.

4. The energy storage apparatus according to claim 1, wherein each of the four connecting portions of the first bus bar is formed by welding the first bus bar and the electrode terminal of each of the four energy storage devices, and
wherein the first bus bar is provided with portions which facilitate deformation of the first bus bar at positions corresponding to inter-row portions and inter-column portions in the four energy storage devices arranged in the two rows and the two columns.

5. The energy storage apparatus according to claim 1, wherein the long side surfaces of the four energy storage devices face toward the first direction, and
wherein positions of the four connecting portions are adjustable in the third direction.

6. The energy storage apparatus according to claim 1, wherein the notch portion is formed as a portion including a gap between the two connecting portions arranged in the second direction.

7. The energy storage apparatus according to claim 6, wherein the long side surfaces of the four energy storage devices face toward the first direction,
wherein the first bus bar electrically and mechanically connects the plurality of energy storage devices to each other, and
wherein the first bus bar is a monolithic single bus bar.

8. An energy storage apparatus comprising:
a plurality of energy storage devices; and
a first bus bar,
wherein the plurality of energy storage devices includes four energy storage devices arranged in two rows and two columns in a first direction and a second direction orthogonal to the first direction and arranged with long side surfaces of the four energy storage devices facing the first direction, the long side surfaces being larger than other side surfaces of the four energy storage devices,
wherein each of the four energy storage devices includes an electrode terminal at an end portion of each of the four energy storage devices in a third direction orthogonal to the first direction and the second direction, and
wherein the first bus bar includes:
four connecting portions electrically connected to the respective electrode terminals of the four energy storage devices, the four connecting portions spaced apart in the first bus bar in a rectangular configuration with each other;
a curved portion arranged at a position in the first direction between two connecting portions arranged in the first direction among the four connecting portions and extending in the second direction; and a notch portion arranged between two connecting portions arranged in the second direction among the four connecting portions and extending along the first direction from an end edge of the first bus bar in the first direction and formed as a portion including a gap between the two connecting portions arranged in the second direction, wherein the long side surfaces of the four energy storage devices are exclusive of edges.

9. The energy storage apparatus according to claim 8, wherein the notch portion extends from the end edge of the first bus bar in the first direction to a position in front of the curved portion.

10. The energy storage apparatus according to claim 8, wherein the curved portion is provided continuously from one end to the other end in the second direction in the first bus bar.

11. The energy storage apparatus according to claim 8, further comprising a second bus bar connected to another electrode terminal of each of two energy storage devices arranged in the first direction among the four energy storage devices, wherein a minimum value of a cross-sectional area of the first bus bar in a conduction path is equal to or larger than a minimum value of a cross-sectional area of the second bus bar in a conduction path.

12. The energy storage apparatus according to claim 8, wherein each of the four connecting portions of the first bus bar is formed by welding the first bus bar and the electrode terminal of each of the four energy storage devices.

13. An energy storage apparatus comprising:

a plurality of energy storage devices; and a first bus bar that electrically and mechanically connects at least four energy storage devices from among the plurality of energy storage devices to each other, wherein the plurality of energy storage devices includes four energy storage devices arranged in two rows and two columns in a first direction and a second direction orthogonal to the first direction, wherein long side surfaces of the four energy storage devices face toward the first direction, the long side surfaces being larger than other side surfaces of the four energy storage devices, wherein each of the four energy storage devices includes an electrode terminal at an end portion of each of the four energy storage devices in a third direction orthogonal to the first direction and the second direction, and wherein the first bus bar includes:

four connecting portions electrically connected to the respective electrode terminals of the four energy storage devices and disposed to electrically and mechanically connect the four energy storage device arranged in the two rows and the two columns via the first bus bar;

a curved portion arranged at a position in the first direction between two connecting portions arranged in the first direction among the four connecting portions and extending in the second direction; and a notch portion arranged between two connecting portions arranged in the second direction among the four connecting portions and extending along the first direction from an end edge of the first bus bar in the first direction, further comprising a second bus bar connected to another electrode terminal of each of two energy storage devices arranged in the first direction among the four energy storage devices, wherein a minimum value of a cross-sectional area of the first bus bar in a conduction path is equal to or larger than a minimum value of a cross-sectional area of the second bus bar in a conduction path, and wherein the first bus bar includes the four connecting portions, each including a via and connected to respective electrode terminals of the four energy storage devices in the single bus bar, wherein the long side surfaces of the four energy storage devices are exclusive of side surfaces that are smaller in surface area than the long side surfaces and edges.

14. The energy storage apparatus according to claim 13, wherein the notch portion extends from the end edge of the first bus bar in the first direction to a position in front of the curved portion.

15. The energy storage apparatus according to claim 13, wherein the curved portion is provided continuously from one end to the other end in the second direction in the first bus bar.

16. The energy storage apparatus according to claim 13, further comprising a second bus bar connected to another electrode terminal of each of two energy storage devices arranged in the first direction among the four energy storage devices, wherein a minimum value of a cross-sectional area of the first bus bar in a conduction path is equal to or larger than a minimum value of a cross-sectional area of the second bus bar in a conduction path.

17. The energy storage apparatus according to claim 13, wherein each of the four connecting portions of the first bus bar is formed by welding the first bus bar and the electrode terminal of each of the four energy storage devices.

18. The energy storage apparatus according to claim 13, wherein the long side surfaces of the four energy storage devices are facing each other.

* * * * *